Nov. 26, 1935.  R. E. BECHTOLD  2,021,882
METER FOR LIQUIDS
Filed March 30, 1933  5 Sheets-Sheet 1

Fig. 1.

INVENTOR.
Reuben E. Bechtold
BY
ATTORNEY.

Nov. 26, 1935. R. E. BECHTOLD 2,021,882
METER FOR LIQUIDS
Filed March 30, 1933 5 Sheets—Sheet 2

Reuben E. Bechtold INVENTOR.
BY
ATTORNEY.

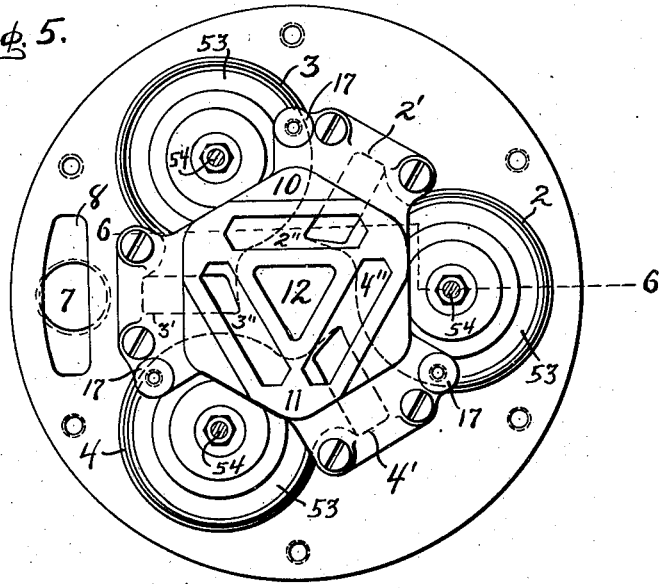
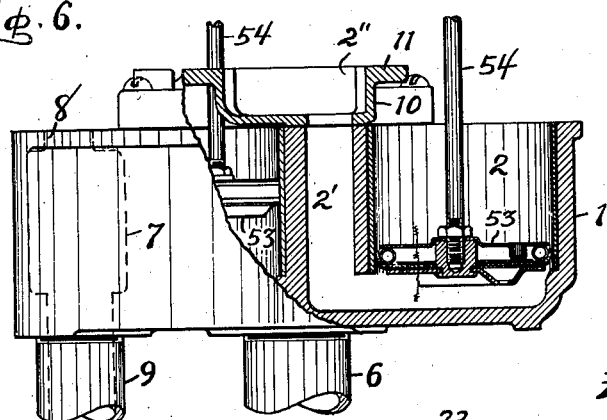

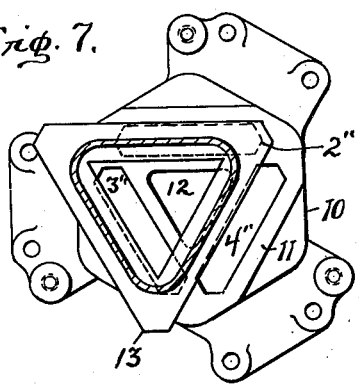
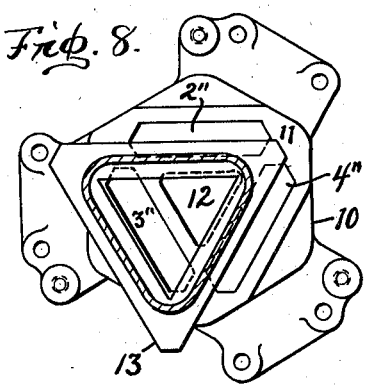
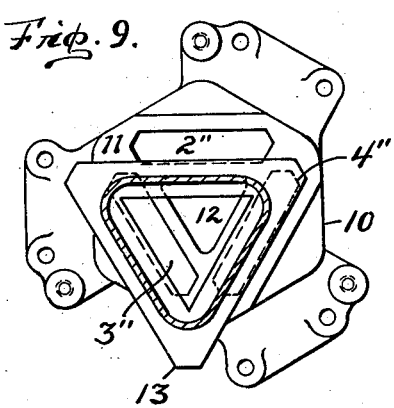
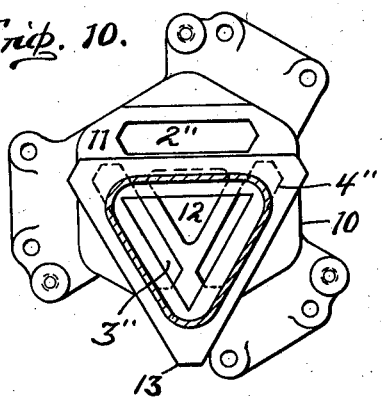
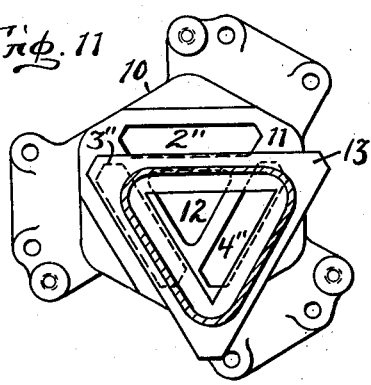
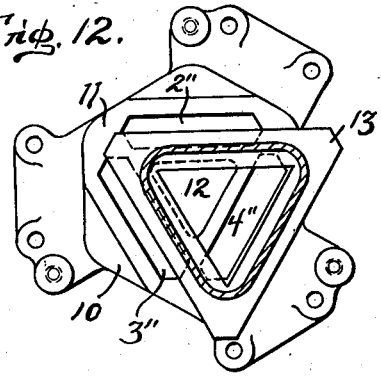

Nov. 26, 1935.  R. E. BECHTOLD  2,021,882
METER FOR LIQUIDS
Filed March 30, 1933  5 Sheets-Sheet 5
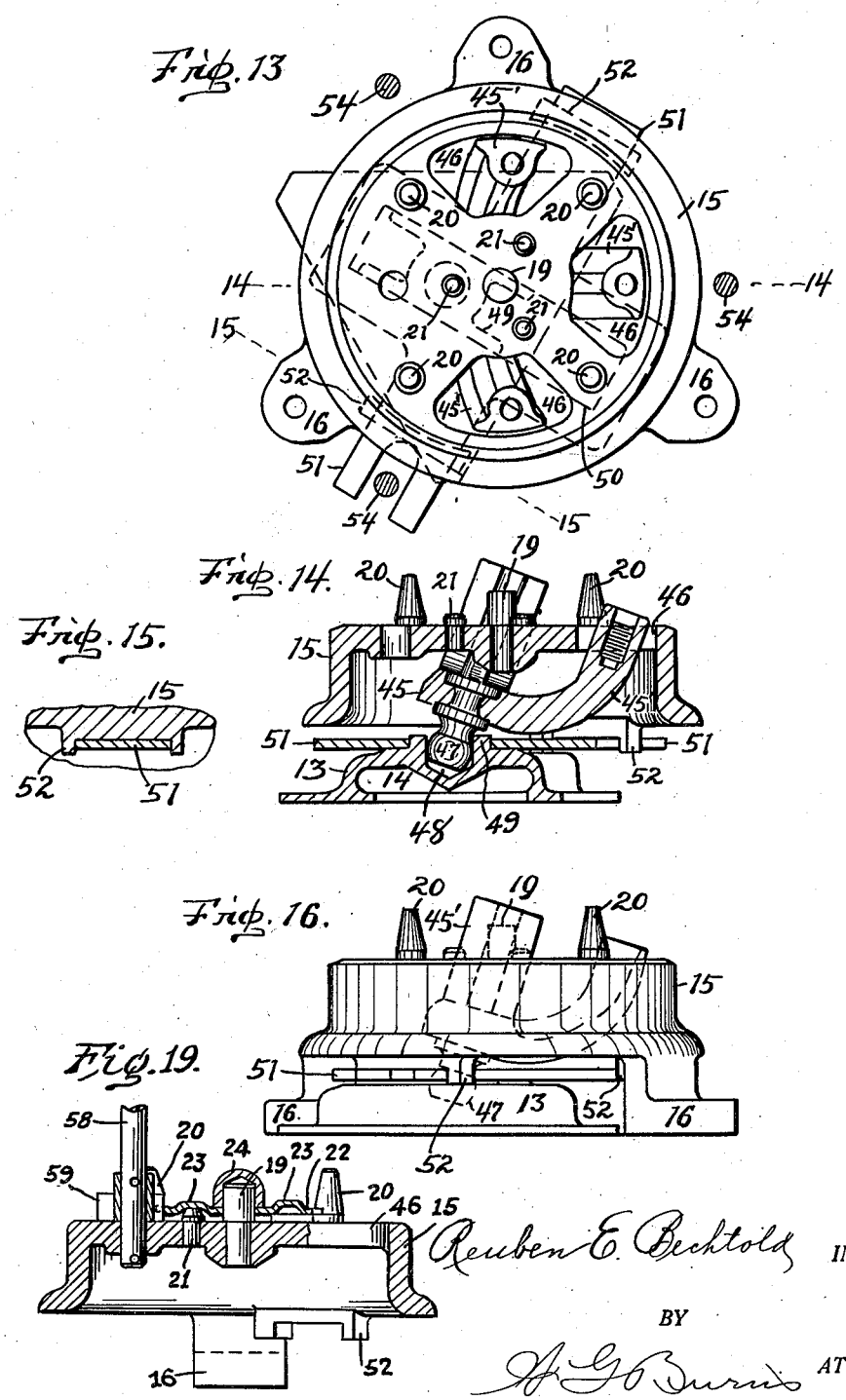
Reuben E. Bechtold INVENTOR.
BY
ATTORNEY.

Patented Nov. 26, 1935

2,021,882

UNITED STATES PATENT OFFICE 2,021,882

METER FOR LIQUIDS

Reuben E. Bechtold, Fort Wayne, Ind., assignor to Tokheim Oil Tank and Pump Company, Fort Wayne, Ind., a corporation of Indiana Application March 30, 1933, Serial No. 663,543

5 Claims. (Cl. 73—30)

This invention relates to improvements in a meter for liquids of the positive displacement type such as is adapted for use in dispensing apparatus where accurate measurement of the volume of liquid delivered is required, and for other uses where the volume of liquid flowing through a pipe line under pressure is to be determined with precision.

One of the objects of the invention is to provide a liquid measuring appliance operated by pressure of the liquid flowing therethrough, so constituted that operation of the appliance and the flow of liquid therethrough by which it is actuated are uniformly concurrent throughout the cycles of operation irrespective of variations in the operating speed or in the pressure of the liquid. Another object is to so construct and arrange the various parts of the apparatus as to occasion but negligible wear and frictional resistance that ordinarily occurs because of corrosion thereof and intermittent or hard usage. Also, it is an object to provide means conveniently accessible for adjustably increasing or decreasing the stroke of the plungers to thereby regulate or vary the displacement of liquid as it passes through the meter.

Further objects and advantages of the invention will appear in the following description:

An illustrative embodiment of the invention in a preferable form is shown in the accompanying drawings, in which:—

Fig. 1 is a vertical section of a meter in which the invention is embodied;

Fig. 5 is a top plan view of the cylinder-block and the ported head positioned thereon, drawn to a reduced scale;

Fig. 6 is a side elevation projected from Fig. 5, a portion being broken away, the section being on the dotted line 6—6 thereof;

Figure 2:
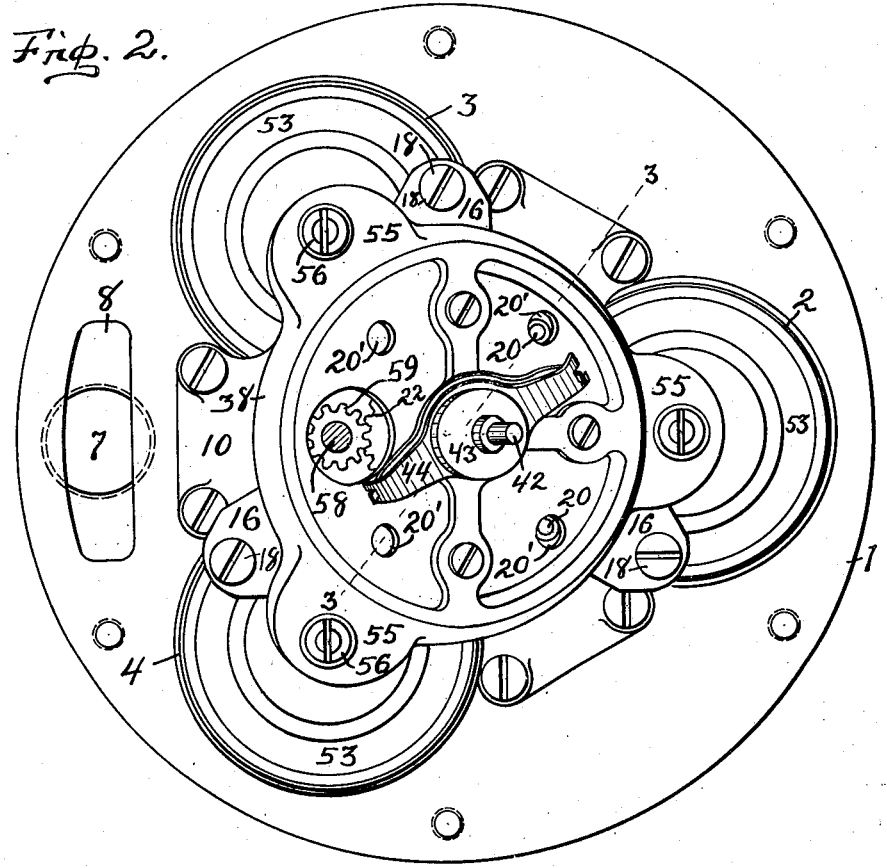
Fig. 2 is a top plan view of the appliance with the cover omitted, the adjusting shaft being in section.

Figs. 7, 8, 9, 10, 11 and 12 are plan views drawn to a reduced scale of the ported cylinder-block head with the slide valve thereon shown in progressive positions in the successive order of the views, the different positions of the valve relative to the ported face of the head being illustrative of the movement of the valve during a portion of its cycle of operation, the section being on the dotted line 1'—1 of Fig. 1;

Fig. 13 is a top plan view of a table for the support of the nutating member and the pilot pins therefor;

Fig. 14 is a vertical section of Fig. 13 on the dotted line 14—14 thereof;

Fig. 15 is a detail cross section of Fig. 13 on the dotted line 15—15 thereof;

Fig. 16 is a side elevation projected from Fig. 13;

Fig. 17 is a top plan view of the table with an adjustable support thereon for the nutating member;

Fig. 18 is a detail view of the adjustable support shown in section along the dotted line 18—18 of Fig. 17 on an enlarged scale; and Fig. 19 is a vertical section of Fig. 17 on the dotted line 19—19 thereof.

The illustrative embodiment of the invention consists of a cylinder-block 1 having an annular series of open-top chambers 2, 3 and 4; a central outlet duct 5 provided at its lower end with a discharge pipe 6; a series of ducts 2', 3' and 4' that have communication respectively with the corresponding chambers 2, 3 and 4 at the lower ends thereof; and an inlet duct 7 that terminates at its top with an open port 8 and is provided at its lower end with a feed pipe 9.

Upon the cylinder-block 1 is positioned a ported head 10, the top of which is flat and constitutes a valve seat 11. The head has therein a series of outlying ports 2", 3" and 4" spaced equally from the center of the head and which have communication respectively with the ducts 2', 3' and 4' for the corresponding chambers 2, 3 and 4. Also, the head is provided with a central port 12 that has communication with the outlet duct 5.

Upon the seat 11 of the head is movably disposed a slide valve 13 having a cavity 14 that is open through the bottom thereof through which is established communication between the outlying ports 2", 3" and 4" successively with the outlet port 12 while the other outlying ports are closed or exposed when said valve is shifted to corresponding positions as illustrated by Figs. 7 to 12 inclusive.

Above the head 10 is positioned a table 15 having legs 16 that are secured respectively upon bosses 17 that project upwardly from the head 10 by means of screws 18, and a stationary post 19 projects upwardly from said table at the center thereof. Upwardly projecting pilot pins 20 are secured on said table in an annular series concentric with said post, and also, a series of studs 21 project upwardly from said table at points spaced equally from each other and from said post.

Upon the post 19 is rotatively mounted a gear 22 having an annular series of cams 23 formed therein that rest upon and have operative relation respectively with said stubs so that as said gear is adjustably rotated the gear is raised or lowered according to the direction of the adjusting movement thereof. The height of said cams gradually increases as shown in Figure 12.

Upon the upper end of the post 19 is loosely disposed a spherical bearing 24 that rests upon the gear 22 and is moved vertically by the adjustments thereof upon said post.

Upon the top of the cylinder block is secured a housing 25, the lower end of which is open to the inlet port and the chambers 2, 3 and 4 in said cylinder-block so that constant communication through the housing is maintained between the inlet and said chambers. In the upper end of the housing is secured a stationary stub shaft 26 disposed in axial alinement with the post 19, and upon the lower end of said shaft is rotatively mounted a gear 27 that is provided with a radially extending lug 28.

Engaging with the gear 27 is a complemental gear 29 which is mounted upon a countershaft 30 that extends up through a sleeve 31 on the housing whereby the countershaft is actuated as the gear 27 is rotated. A gland 32 on the countershaft is positioned in the top of the sleeve and is held in place by a cap 33 that is secured on the sleeve by screws 34. A packing 35 together with a washer 36 and a compression spring 37 are disposed upon the countershaft within the sleeve which are compressed by the gland to prevent leakage from the housing about the countershaft out through the sleeve.

Within the housing is contained a nutating member 38, the hub 39 of which is shaped at its lower end to receive the bearing 24 and have movable support thereon. The nutating member has an annular bearing face 40 that has rolling engagement with a complemental annular bearing face 41 on the table 15 by which the tilt of the nutating member is positively limited.

The nutating member 38 has an axial stem 42 extending therefrom that engages the lug 28 and causes rotation of the gear 27 upon actuation of the nutating member. Upon the stem 42 is loosely disposed a cone 43 that rests upon a spring bolster 44 disposed on said stem between said cone and the hub of the nutating member by which the cone is held yieldingly in contact with the lower end of the stub-shaft 26 whereby the nutating member is sustained in a tilted position with its bearing face 40 constantly in rambling contact with the complemental face 41 on the table as the nutating member is actuated.

Figure 3:
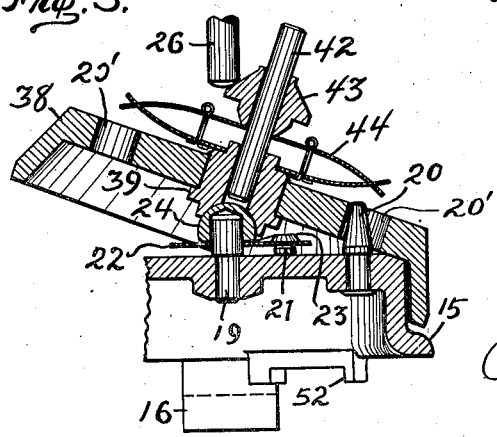
Fig. 3 is a detail vertical section of the nutating member and the supporting means therefor.

The nutating member 38 has a pendent spider 45, the arms 45' of which have free movement through corresponding openings 46 in the table top, and said spider at its lower end has a pendent knob 47 that projects into a socket 48 made in the top of the valve 13 so that when the nutating member is actuated the valve 13 is accordingly gyrated upon the face 11 of the ported head 10. The valve 13 has an integral crosshead 49 that projects into an elongated slot 50 made in a movable plate 51 that has guided movement in slotted lugs 52 that depend from opposite sides of the table 15. The direction of movement of said plate in the slotted lugs relative to the movement of the cross-head 49 in the slot 50 in the movable plate is substantially in a common plane and at right angles to each other. By this means rotation of the valve upon its axis is prevented without hindering its gyratory movement on the valve face 11, and the nutating member 38 also is prevented from revolving upon its axis because of the pilot pins 20 that project in successive order into corresponding openings 20' in the nutating member during its cycle of action. (Figs. 2 and 3.)

Each of the chambers 2, 3 and 4 has therein a plunger 53 provided with a rod 54 that extends up through a corresponding radial lug 55 on the nutating member 38 and has on its upper end a swivel head 56 that is seated in a socket 57 made in said lug so that as said plungers are actuated downwardly, tilting movement is imparted to the nutating member accordingly.

An adjusting shaft 58 extends upwardly from the table 15 in which it has rotative movement, and a pinion 59 is secured on said shaft that meshes with the cam gear 22 so when the shaft 58 is adjustably rotated the cam gear and the bearing 24 on the supporting post 19 are accordingly raised or lowered and the extent of the tilting movement of the nutating member and consequent stroke of the plungers connected therewith are increased or decreased and the measurement of liquid by the meter is adjustably altered.

Through the top of the housing 25 extends an adjusting stem 60 that has axial and turning movement therein and has a sliding spliced connection 61 with the adjusting shaft 58 that is axially alined therewith. The connection 61 is encased loosely by a sleeve 62 that is pinned on the stem 60 by which is preserved proper alinement of said shaft and stem.

A packing 63 is disposed in the top of the housing on the stem, and a collar 64 is provided to hold the packing in place.

Figure 4:
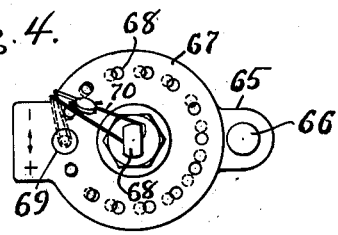
Fig. 4 is a detail plan view of the locking and sealing appliance for the adjusting shaft.

An anchor plate 65 is mounted loosely upon the upper portion of the stem 60, and the upper end of the post 26 projects through an opening 66 in the anchor plate so that turning movement of the anchor plate on the stem is thereby prevented. (Figs. 1 and 4.) Also, a lock plate 67 is secured on the flattened top end 60' of the stem 60 with which the lock-plate has splined relation whereby turning of the stem without corresponding turning movement of the lock plate therewith is prevented. The anchor plate 65 and the lock plate 67 each have an annular series of plug openings 68 for the reception of a sealing plug 69 that is applied through selected openings in said plates, whereby turning adjustment of the stem is forestalled. Preferably, the sealing plug is secured in engaging position by means of a suitable seal 70 that is applied to the sealing plug and through an opening 71 in the upper end of the stem to prevent unauthorized removal of the sealing plug and adjustment of the stem. The lock plate 67 is firmly secured on the stem by means of a washer 72 and threaded nut 73 which are disposed upon the stem.

As a means to prevent leakage from within the housing out between its top and the stem 60, a compression spring 74 is disposed around the stem between the top of the housing and the anchor plate 65 which tends to move the stem upwardly causing the packing 63 to be compressed by the collar 64, the necessary endwise movement of the stem relative to the adjusting shaft 58 being permitted because of its spliced connection therewith.

In the operation, the liquid to be metered is supplied under pressure from a suitable source to the housing chamber 75 through the feed pipe 9 from which it passes through the inlet duct 7 and open port 8. The liquid thus supplied enters the plunger chambers 2, 3 and 4 from the housing through their constantly open tops and exerts downward pressure upon the plungers therein which cause corresponding downward pressure upon the nutating member through their swivel connections therewith. Also, the liquid in the housing is admitted to the lower ends of the chambers 2, 3 and 4 in successive order through the corresponding ports 2'', 3'' and 4'' and their complemental ducts 2', 3' and 4' as said ports are exposed upon movement of the valve 13. Thus, the downward pressure of liquid on the plungers is counteracted periodically by upward pressure of the liquid or during the admission of liquid successively into the lower ends of the chambers as controlled by the valve. Coincidentally, with admission of liquid into the lower end of one chamber through its complemental port, escape of the liquid from the lower end of another of said chambers takes place through its complemental port and the discharge port 12 which then have communication through the cavity 14 in the valve 13.

In Fig. 7 is shown the valve 13 positioned to permit escape of liquid from the lower end of the chamber 3 through its port 3'' and the discharge port 12 and to permit entrance of liquid from the housing into the lower end of the chamber 4 through its port 4'' which is then exposed, while the port 2'' is closed by the valve; in Fig. 8, the valve is positioned for entrance of liquid from the housing into the lower end of the chambers 2 and 4 through their ports 2'' and 4'', which are then exposed, while escape of liquid from the chamber 3 is permitted through the port 3'' and discharge port 12 which are connected by the cavity in the valve; in Fig. 9, the valve is positioned so that the chamber port 3'' and discharge port 12 are connected by the valve while the chamber port 2'' is exposed and the port 4'' is completely closed; in Fig. 10, the chamber ports 3'' and 4'' and the discharge port 12 have connection through the valve while the chamber port 2'' is exposed; in Fig. 11, the chamber port 4'' and discharge port 12 are connected through the valve while the port 3'' is completely closed and the chamber port 2'' is exposed; and in Fig. 12, the chamber ports 2'' and 3'' are partially exposed while the chamber port 4'' and discharge port 12 are connected through the valve. As the valve continues in its cycle of action the exposure and closing of the chamber ports and their communication with the central discharge port 12 are sequential as in the manner indicated in the figures just described.

As the plungers are relieved of upward pressure by the escape of the liquid from the lower ends of their chambers through the discharge port, downward movement to said plungers is imparted by the liquid entering the upper ends of the chambers, whereupon, the nutating member is swung upon the spherical bearing 24 and caused to roll upon the annular bearing face 41 on the table, and the valve 13 is moved in its circular course upon the seat 11 whereby the ports 2'', 3'' and 4'' are severally exposed in successive order followed likewise by their communication with the discharge port 12 through the cavity 14 in the valve 13. Also, as the nutating member is thus actuated, the upper end of the stem 42 is moved in a circuitous course, causing rotation of the gear 27 by which the countershaft 30 is actuated through the medium of the gear 29. The pressure of the cone 43 against the lower end of the stub shaft 26 imparted through the medium of the bolster spring has the effect of holding the nutating member constantly in contact with the bearing face 41 on the table and thereby unintentional tilting movement of the nutating member and consequent variation in the stroke of the plungers during normal operation thereof is averted. By this arrangement and by adjustment of the stem 60 the quantitative displacement of the liquid from the lower ends of the chambers upon the downward strokes of the plungers is definitely and accurately regulated.

The countershaft 30 is intended for connection with any suitable recording or integrating appliance (not shown) as in the usual practice so that the quantity of liquid that passes through the meter is thereby indicated.

I claim:

1. In liquid metering apparatus, a housing, a cylinder-block secured to the housing provided with an annular series of chambers that have communication through their upper ends with the interior of the housing, and provided also with a central outlet duct and a series of other ducts communicating with the lower ends of said chambers, a head for said cylinder block provided with a valve seat, an outlet port communicating with said outlet duct and a series of other ports communicating respectively with the chamber ducts, a slide valve disposed on said seat having a cavity therein for connecting said other ports selectively with the outlet port and having a cross head, a stationary table disposed above said valve, a movable plate having a slot in which said cross head has guided reciprocating movement disposed to prevent turning of said valve upon its axis and permit gyratory movement thereof upon said seat, an adjustable bearing supported centrally upon said table, a stub shaft in the top of the housing alined with said bearing and spaced therefrom, a nutating member supported on said bearing disposed to roll upon said table and provided with an axial stem, a spring-pressed cone on said stem bearing against said shaft, a gear on said shaft operatively engaged by said stem, a counter-operating mechanism actuated by said gear, an adjusting mechanism for said bearing, a spider secured to the nutating member operatively associated with said valve, a plunger in each of said chambers operatively connected with said nutating member, and means for supplying liquid under pressure to the housing.

2. In liquid metering apparatus, a cylinder-block and complemental housing secured thereto, said block having an annular series of chambers each of which has open communication at one end with the interior of the housing, a head on said block provided with a series of ports having communication respectively with the corresponding opposite ends of said chambers and provided also with an outlet port, a valve arranged to have movement on said head disposed to sequentially connect the ports of said series with said outlet port, a stationary table having a central bearing member and an annular bearing face concentric therewith, a stub-shaft projecting into the housing alined with said central bearing member, a nutating member supported on said central bearing member disposed to roll upon said face and having an operative connection with said valve and an axial stem, a cone rotatably mounted on said stem, a spring acting to press said cone into bearing contact with said shaft, a counter-operating mechanism supported by the housing and operatively associated with said stem, a plunger in each of said chambers operatively connected with said nutating member, and means for supplying liquid under pressure to said housing.

3. In liquid metering apparatus, a cylinder block having a series of piston chambers therein, a housing having communication with said chambers respectively at one end thereof and provided with an inlet, a head on said cylinder block provided with a series of ports that have communication respectively with the corresponding opposite ends of said chambers and provided with an outlet port, a valve arranged to have gyratory movement on said head disposed to sequentially connect the ports of said series with said outlet port, a stationary table having a central bearing member and an annular bearing face concentric therewith, means controlled from the exterior of the housing for adjustably raising or lowering said central bearing, a counter-operating mechanism supported by the housing, a nutating member supported on said central bearing member disposed to roll upon said face and having actuating connection with said counter-operating mechanism, plungers in said chambers operatively connected respectively with said nutating member, a connection secured to said nutating member and engaging said valve adapted to directly impart gyratory movement to the valve when the nutating member is actuated, and mechanism to prevent axial rotation of said valve.

4. A liquid meter consisting of a cylinder-block and complemental housing attached thereto, said block having a series of chambers therein each communicating at one end thereof with said housing, a head-block having a series of ports communicating with the opposite ends of said chambers respectively and having also an outlet port, a valve having movement on said head-block controlling said ports, a counter-actuating mechanism in supported connection with said housing, a stationary table supported above said head-block provided with an annular bearing face and a central bearing member, a cam gear and its supporting studs disposed for vertical adjustment of said central bearing, means for adjusting said gear, a nutating member on said central bearing disposed to roll on said face and being operatively connected with said valve and counter-actuating mechanism, a plunger in each of said chambers operatively connected with said nutating member, and means to supply liquid under pressure to said housing.

5. A liquid meter having a cylinder block and complemental housing provided with an inlet and outlet, reciprocating plungers in said cylinder block, a pivotally supported nutating member operatively connected with said plungers and provided with an axial stem, a stub shaft projecting into the housing alined with the pivotal support for said nutating member, a cone movable on said stem, a spring acting to press said cone against said shaft to sustain said nutating member in operating position on its support, and a counter mechanism actuated by said stem.

REUBEN E. BECHTOLD.